(12) United States Patent
Kikuchi

(10) Patent No.: US 11,880,592 B2
(45) Date of Patent: Jan. 23, 2024

(54) MEMORY SYSTEM ADJUSTING PACKET SIZE AND METHOD

(71) Applicant: Kioxia Corporation, Tokyo (JP)

(72) Inventor: Takeshi Kikuchi, Isehara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 24 days.

(21) Appl. No.: 17/549,440

(22) Filed: Dec. 13, 2021

(65) Prior Publication Data

US 2023/0055882 A1 Feb. 23, 2023

(30) Foreign Application Priority Data

Aug. 18, 2021 (JP) ................. 2021-133367

(51) Int. Cl.
*G06F 3/06* (2006.01)

(52) U.S. Cl.
CPC .......... *G06F 3/0656* (2013.01); *G06F 3/0604* (2013.01); *G06F 3/0619* (2013.01); *G06F 3/0659* (2013.01); *G06F 3/0679* (2013.01)

(58) Field of Classification Search
CPC .... G06F 3/0656; G06F 3/0604; G06F 3/0619; G06F 3/0659; G06F 3/0679
See application file for complete search history.

(56) References Cited

U.S. PATENT DOCUMENTS

| | | | |
|---|---|---|---|
| 10,860,449 B2 | 12/2020 | Sharma et al. | |
| 2014/0064298 A1 | 3/2014 | Ukai | |
| 2016/0350250 A1 | 12/2016 | Vasudevan et al. | |
| 2019/0278477 A1* | 9/2019 | Benisty | G06F 3/0655 |
| 2020/0142621 A1* | 5/2020 | Bae | G06F 12/0862 |
| 2020/0278932 A1* | 9/2020 | Bavishi | G06F 12/0893 |

FOREIGN PATENT DOCUMENTS

| | | |
|---|---|---|
| JP | 6273010 B2 | 1/2018 |
| JP | 6273664 B2 | 2/2018 |

* cited by examiner

*Primary Examiner* — Edward J Dudek, Jr.
(74) *Attorney, Agent, or Firm* — Allen & Overy LLP

(57) ABSTRACT

According to one embodiment, a memory system includes a nonvolatile memory and a controller. The controller communicates with a host. The host includes a host memory and a circuit. The circuit accesses the host memory in a unit of first size. When an address designated as a first location of the host memory where data read from the nonvolatile memory is to be stored is not aligned with a boundary in the host memory defined in a unit of the first size, the controller transmits a first packet which has a size from the first location to the boundary and includes the read data to be stored from the first location, and transmits a second packet which has the first size and includes the read data to be stored from the boundary thereafter.

20 Claims, 14 Drawing Sheets

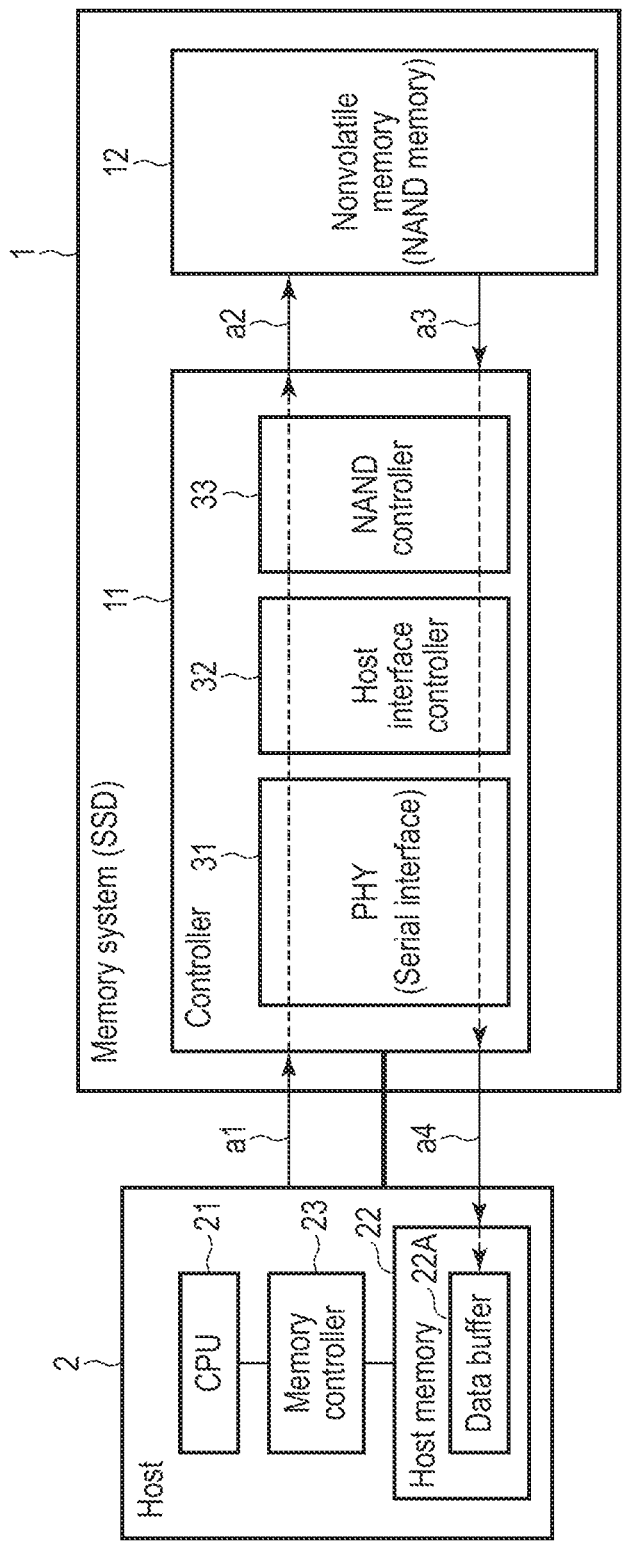
F I G. 1

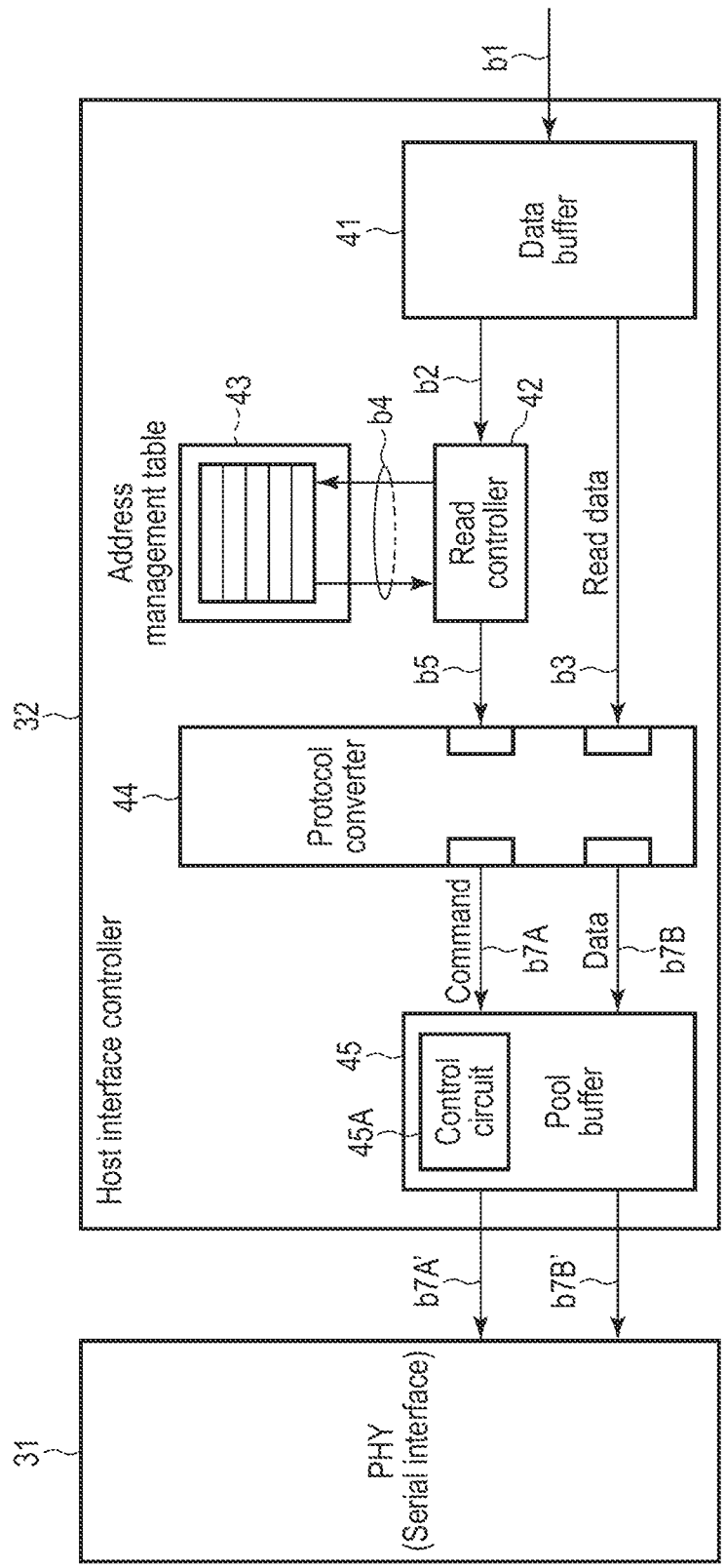
F I G. 2

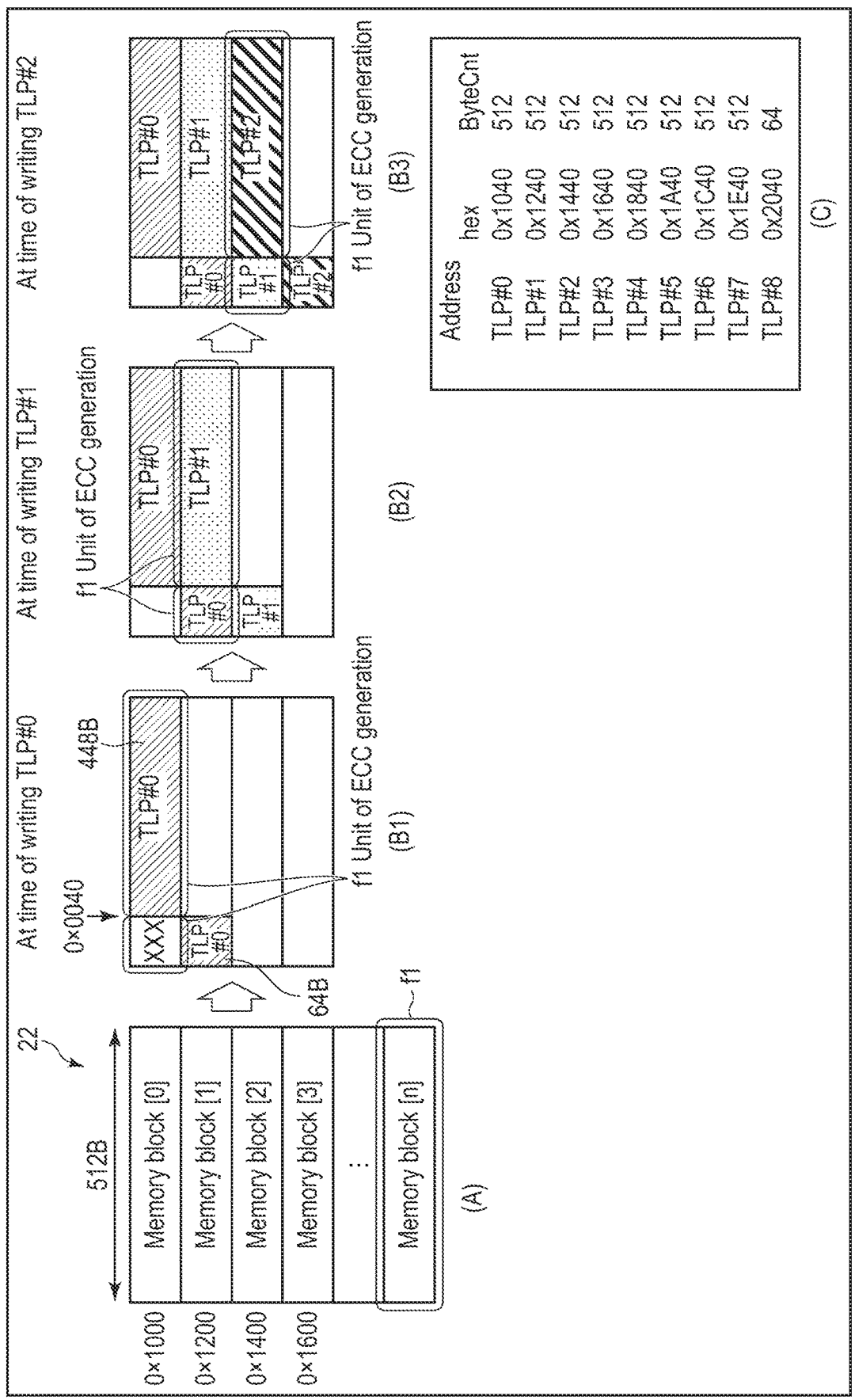
F I G. 5

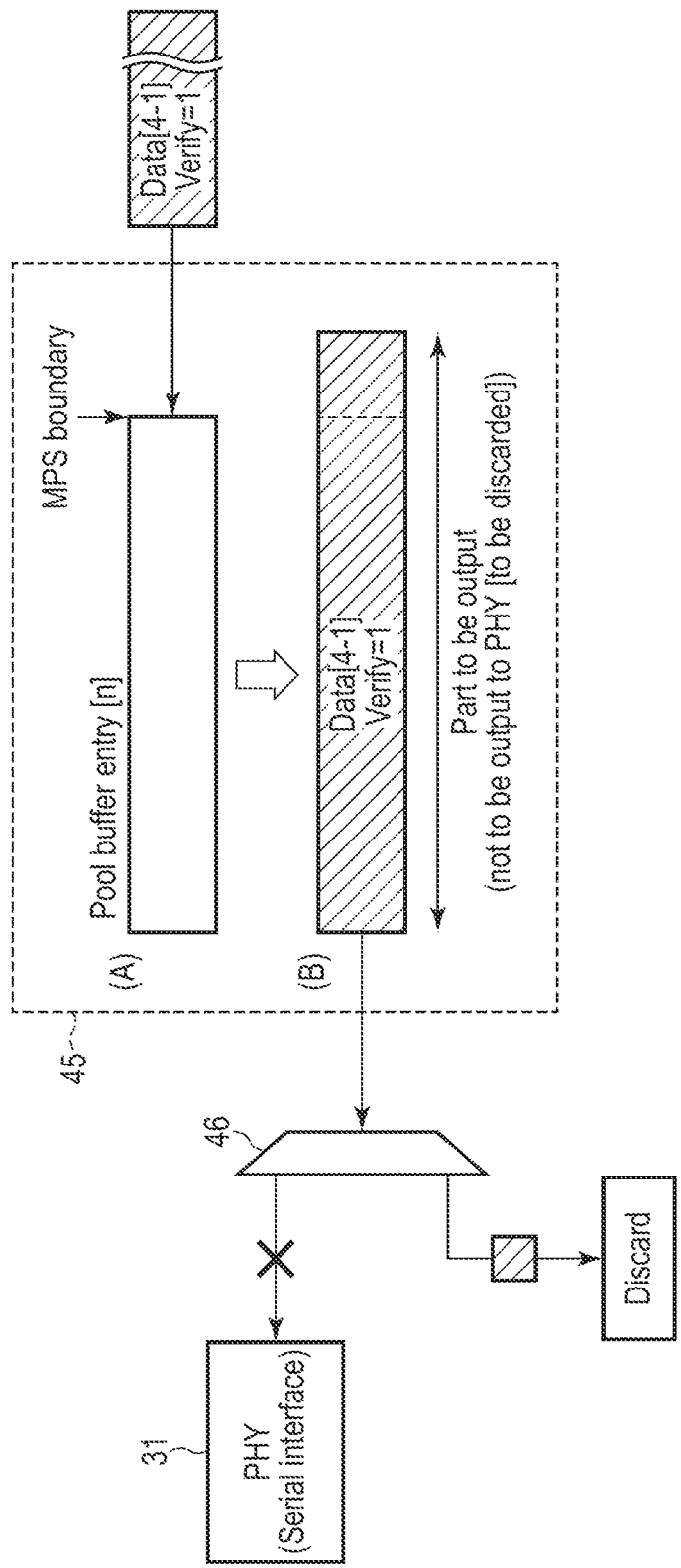
F I G. 12

MEMORY SYSTEM ADJUSTING PACKET SIZE AND METHOD

CROSS-REFERENCE TO RELATED APPLICATIONS

This application is based upon and claims the benefit of priority from Japanese Patent Applications No. 2021-133367, filed Aug. 18, 2021, the entire contents of which are incorporated herein by reference.

FIELD

Embodiments described herein relate generally to a memory system and a method.

BACKGROUND

Recently, memory systems that implement nonvolatile memories have been widespread. For example, a solid state drive (SSD) implementing a NAND flash memory (NAND memory) is used as a storage of an information processing device such as a server or a personal computer.

The SSD which communicates with the information processing device (e.g., host) with a protocol compliant with the NVM Express (NVMe)™ specification can perform data transmission to store data read from the NAND memory into a location in a host memory designated by the host.

In an interface compliant with the PCI Express (PCIe)™ specification used to transmit and receive a command and data defined by the NVMe™ specification, data is transmitted and received in a unit of transaction-layer packet (TLP). The maximum length called a maximum payload size (MPS) is defined for the TLP. The MPS may be defined to match, for example, a unit of access to the host memory by the host. On the other hand, regarding the location of data in the host memory, which is transmitted using the TLP, there is no restriction of address alignment.

Therefore, the data transmitted using the TLP is not always stored in alignment with a boundary defined in a unit of access to the host memory by the host. When the data is not aligned with the boundary, mostly, the data transmitted using the TLP crosses the boundary of access to the host memory by the host. In this case, for example, an overhead of access is increased for obtaining the items of data stored across the boundary.

BRIEF DESCRIPTION OF THE DRAWINGS

FIG. 1 is an illustration showing an example of a configuration of a memory system according to an embodiment, which is connected to a host.

FIG. 2 is an illustration showing an example of a configuration of a host interface controller of the memory system according to the embodiment.

FIG. 5 is an illustration showing an example where a memory system according to a comparative example transmits read data to the host with a TLP.

FIG. 12 is a first illustration showing a first example of exceptional operations of the pool buffer of the memory system according to the embodiment.

DETAILED DESCRIPTION

Figure 3:
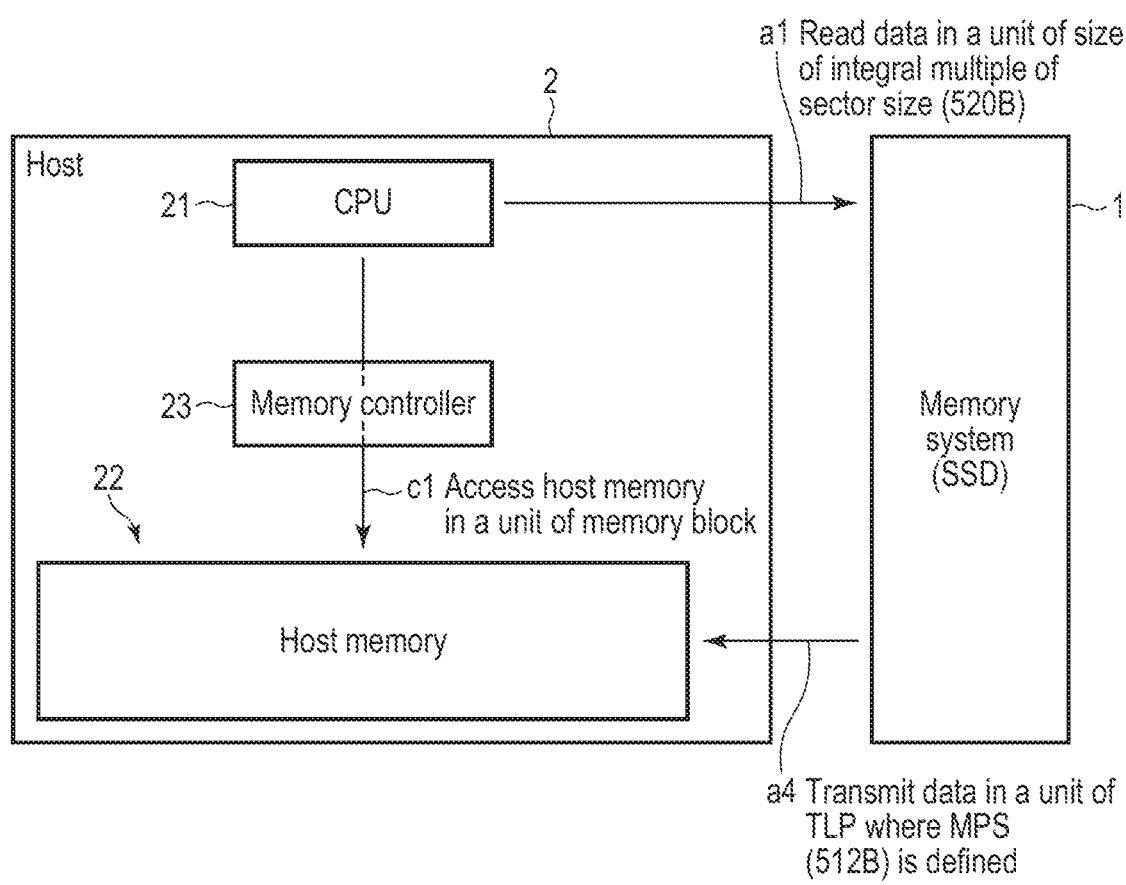
FIG. 3 is an illustration showing a unit of handling read data from the memory system according to the embodiment.

Embodiments will be described hereinafter with reference to the accompanying drawings.

In general, according to one embodiment, a memory system is connectable with a host. The host includes a host memory and a control circuit. The control circuit is configured to access the host memory in a unit of a first size. The memory system includes a nonvolatile memory and a controller. The controller is capable of communicating with the host. When an address designated by the host as a first location of the host memory where read data read from the nonvolatile memory is to be stored is not aligned with a boundary in the host memory defined in a unit of the first size, the controller is configured to transmit, to the host, a first packet which has a size from the first location to the boundary and includes the read data to be stored from the first location, and transmit, to the host, a second packet which has the first size and includes the read data to be stored from the boundary thereafter.

FIG. 1 is an illustration showing an example of a configuration of a memory system 1 according to an embodiment. FIG. 1 also shows an example of a configuration of an information processing system which includes the memory system 1 and a host 2 connected to the memory system 1.

The memory system 1 is a storage device. An example of the memory system 1 is realized as an SSD. The host 2 is an information processing device. The host 2 is, for example, a server or a personal computer. The memory system 1 and the host 2 are connected to each other with, for example, an interface compliant with the PCIe™ specification. In addition, the memory system 1 and the host 2 communicate with each other with, for example, a protocol compliant with the NVMe™ specification. In the PCIe™, data is transmitted and received in a unit of TLP. That is, the transmission and reception of data between the memory system 1 and the host 2 are performed in a unit of TLP.

The host 2 includes a central processing unit (CPU) 21, a host memory 22 and a memory controller 23. The CPU 21 is a processing device which executes various programs. The various programs are, for example, an operating system, utility software, application software and a driver. The CPU 21 executing, for example, the operating system issues a write command requesting to write data and a read command requesting to read data to the memory system 1.

The host memory 22 is a main memory of the host 2. The host memory 22 is, for example, a dynamic random access memory (DRAM). A data buffer 22A which temporarily stores data read from the memory system 1 is provided in the host memory 22. A data buffer which temporarily stores data to be written to the memory system 1 may be further provided in the host memory 22.

The memory controller 23 is a control device which controls access to the host memory 22. The memory controller 23 is configured as, for example, a hardware circuit. The memory controller 23 and the CPU 21 may be configured as one piece of hardware.

The memory system 1 includes a controller 11 and a nonvolatile memory 12. An example of the nonvolatile memory 12 is a NAND flash memory. Hereinafter, the nonvolatile memory 12 may be referred to as a NAND memory 12. The controller 11 is configured as, for example, a system-on-a-chip (SoC). The function of each unit of the controller 11 may be realized by dedicated hardware, a processor executing a program (firmware) or a combination thereof.

The controller 11 is a control device which controls the NAND memory 12 according to a command from the host 2. For example, when the controller 11 receives a write command from the host 2, the controller 11 controls writing of data (write data) designated by the host 2 to the NAND memory 12. In addition, when the controller 11 receives a read command from the host 2, the controller 11 controls reading of data (read data) designated by the host 2 from the NAND memory 12.

The controller 11 includes a physical layer (PHY) 31, a host interface controller 32, and a NAND controller 33.

The PHY 31 is a processing device realizing the function of a physical layer in the open systems interconnection (OS) layer model. The PHY 31 controls input of a serial signal from a connector connecting the controller 11 and the host 2 and output of a serial signal to the connector.

The host interface controller 32 controls transmission and reception of data to and from the host 2. For example, the host interface controller 32 receives a plurality of TLPs that include write data from the host 2, and takes out the write data from each of the TLPs. In addition, the host interface controller 32 contains in a plurality of TLPs read data read from the NAND memory 12, and transmits each of the TLPs to the host 2.

The NAND controller 33 controls writing of data to the NAND memory 12 and reading of data from the NAND memory 12.

Symbols a1 to a4 in FIG. 1 show a flow from when the host 2 issues a read command to when data (read data) designated by the read command is transmitted from the memory system 1 to the host 2.

The host 2 issues a read command (a1) which designates a logical address associated with read data and the size of the read data to the memory system 1. The logical address is, for example, a logical block address (LBA). The size of the read data is represented in, for example, a unit called a sector. The size of the sector is, for example, 520 bytes. The read command also designates an address indicating a location in the host memory 22 (e.g., in the data buffer 22A) where the read data is to be stored.

The host 2 can designate a plurality of addresses as the location in the host memory 22 where the read data is to be stored. For example, even when the data buffer 22A has no continuous free region having a size greater than the size of the read data, the host 2 can, by combining a plurality of free regions each having a size less than the size of the read data, allocate a free region having the size of the read data in the data buffer 22A, and issue the read command. The address indicating the location in the host memory 22 is hereinafter referred to also a host memory address.

As a format of an address list to designate the host memory address, a physical region page entry/list (PRP) or a scatter gather list (SGL) are known. The PRP/SGL stores, for example, a plurality of host memory addresses each indicating the start location of a region having a certain size. The number of host memory addresses stored in the PRP/SGL varies according to the size of the read data. When a plurality of non-continuous free regions in the data buffer 22A are combined and set as the storage destination of the read data, a plurality of PRP/SGLs may be used.

When the read command is received, the controller 11 of the memory system 1 controls the NAND memory 12 (a2) to output the read data based on a physical address indicating a location in the NAND memory 12 corresponding to the logical address designated in the read command, and the size of the read data. Under the control by the controller 11, the NAND memory 12 performs an output operation (a3) so that the read data is read from the NAND memory 12.

The controller 11 contains in a plurality of TLPs the read data read from the NAND memory 12 and transmits each of the TLPs to the host 2 (a4) as described above. Each TLP transmitted from the memory system 1 to the host 2 also includes the host memory address. The read data transmitted from the memory system 1 to the host 2 by the TLP is stored in the location in the host memory 22 (data buffer 22A) indicated by the host memory address.

The CPU 21 executing, for example, the operating system manages data stored in the host memory 22, for example, in a unit of sector. As described above, the size of the sector is, for example, 520 bytes. In other words, the host memory 22 includes a plurality of first sections each having a size of 520 bytes. That is, a first boundary is defined in a unit of 520 bytes in the host memory 22.

On the other hand, the memory controller 23 accesses data stored in the host memory 22, for example, in a unit of 512 bytes. The memory controller 23 generates an error correction code (ECC) parity for data stored in the host memory 22, for example, in a unit of 512 bytes. Along with this, the host memory 22 includes a plurality of sections (also referred to as memory blocks) each having a size of 512 bytes in addition to the first sections. That is, a second boundary is defined in a unit of 512 bytes in the host memory 22. The second boundary is hereinafter referred to as a host access boundary.

In the TLP to transmit and receive data between the host 2 and the memory system 1, the maximum length called the MPS is defined by the PCIe™ specification. The MPS is defined as exponent of 2. The MPS may be defined, for example, to match the size of the memory block of the host memory 22. The MPS is, for example, 512 (i.e., 2 to the power of 9). On the other hand, data transmitted with the TLP is not always stored in alignment with the host access boundary in the host memory 22.

For example, it is assumed that the data transmitted with the TLP is stored in the host memory 22 across the boundary of two memory blocks (referred to as the first memory block and the second memory block). In this case, to store the data newly transmitted with the TLP into the host memory 22, the memory controller 23 needs to perform writing twice, that is, writing to the first memory block and writing to the second memory block. In addition, the memory controller 23 needs to read data already stored in the first memory block, combine it with the data newly transmitted with the TLP, and regenerate the ECC parity for the first memory block. Therefore, when the memory controller 23 writes the data newly transmitted with the TLP in the host memory 22, an overhead increases.

The memory system 1 of the embodiment aims to efficiently transmit the read data to the host 2 with the TLP when the host memory address designated by the host 2 is different from the host access boundary. More specifically, the memory system 1 uses a mechanism which ensures address alignment with the host access boundary for the read data transmitted to the host 2 with the TLP. This point will be hereinafter described in detail.

FIG. 2 is an illustration showing an example of a configuration of the host interface controller 32 of the memory system 1 according to the embodiment.

As shown in FIG. 2, the host interface controller 32 includes a data buffer 41, a read controller 42, an address management table 43, a protocol converter 44 and a pool buffer 45.

The address management table 43 is a table to manage a host memory address designated with a read command issued by the host 2. The address management table 43 includes a plurality of entries. A list (PRP/SGL) of host memory addresses designated with one read command is stored in each entry. A plurality of PRP/SGLs may be stored in each entry. The maximum number of entries of the address management table 43 is the number of read commands that can be queued by the memory system 1.

The data buffer 41 is a buffer which temporarily stores read data (b1) transmitted from the NAND controller 33. The data buffer 41 is provided in, for example, an SRAM (not shown) in the controller 11. When the read data is stored, the data buffer 41 notifies the read controller 42 of it (b2). In addition, the data buffer 41 transmits the read data (b3) to the protocol converter 44.

The read controller 42 is a control device which controls transmission of read data to the host 2. When the notification is received from the data buffer 41, the read controller 42 starts processing to transmit the read data stored in the data buffer 41 to the host 2. The read controller 42 obtains, from the address management table 43, a host memory address (b4) designated as the storage destination of the read data by the host 2. The read controller 42 transmits, to the protocol converter 44, a request (b5) which requests to transmit the read data to the host 2. This request designates the host memory address obtained from the address management table 43 as the storage destination of the read data.

More specifically, the read controller 42 transmits a plurality of requests (b5) sequentially to the protocol converter 44. Each of the requests designates a host memory address and a data size, and requests to transmit the read data (b3) transmitted from the data buffer 41 to the host 2 in a unit of this data size. The data size designated here is less than or equal to the MPS. Accordingly, the read data can be transmitted to the host 2 with the TLP having a size less than or equal to the MPS.

The protocol converter 44 is a processing device which converts a request transmitted from the read controller 42 to a protocol receivable by the PHY 31. A symbol b7A indicates a command which corresponds to the request (b5) transmitted from the read controller 42. A symbol b7B indicates read data which corresponds to the read data (b3) transmitted from the data buffer 41 and is the processing target of the command indicated by the symbol b7A.

The command (b7A) and the data (b7B) output from the protocol converter 44 are generated based on the host memory address and the data size designated with the request (b5) transmitted from the read controller 42. That is, the host memory address designated with the request (b5) is designated in the command (b7A), and the data (b7B) has the data size designated with the request (b5).

The read controller 42 determines the host memory address and the data size designated with the request (b5), which is to be transmitted to the protocol converter 44, based on the host memory address obtained from the address management table 43. The host memory address obtained from the address management table 43 is the host memory address stored in the PRP/SGL by the host 2. The host 2 (more specifically the CPU 21) determines the host memory address according to, for example, the availability of the host memory 22 (e.g., data buffer 22A). Note that, the host memory address stored in the head of the PRP/SGL by the host 2, that is, the host memory address indicating the start location of an available region in the host memory 22 serving as the storage destination of the read data does not always match the host access boundary (that is a unit of access by the memory controller 23).

For example, when the host memory address designated with the command (b7A) transmitted from the protocol converter 44 is different from the host access boundary, the pool buffer 45 reconfigures the command (b7A) and the read data (b7B) to ensure address alignment with the host access boundary. The pool buffer 45 includes a control circuit 45A which controls reconfiguration of the command (b7A) and the read data (b7B). A symbol b7A' indicates the command reconfigured by the control circuit 45A. A symbol b7B' indicates the read data reconfigured by the control circuit 45A.

FIG. 3 is an illustration showing a unit of handling of reading data from the memory system 1. A symbol a1 and a symbol a4 correspond to the symbol a1 and the symbol a4 of FIG. 1.

The CPU 21 executing, for example, the operating system issues a command (a1) to read data having a size of an integral multiple of the sector size to the memory system 1. As described above, the sector size is, for example, 520 bytes. On the other hand, the memory system 1 transmits data (a4) read from the NAND memory 12 according to the command from the host 2 to the host 2 in a unit of TLP where the MPS is defined. As described above, the MPS is defined, for example, to match the size of the memory block in the host memory 22. The size of the memory block is, for example, 512 bytes.

The data transmitted from the memory system 1 to the host 2 with the TLP is stored in a location in the host memory 22 (e.g., data buffer 22A) indicated using a host memory address included in the TLP. The memory controller 23 accesses the data buffer 22A (c1) where data from the memory system 1 is stored in a unit of memory block.

Next, an example where the host 2 reads 16 sectors of data from the memory system 1 will be described with reference to FIG. 4. A symbol c11 indicates the first section (sector) of the host memory 22. A symbol c12 indicates the second section (memory block) of the host memory 22.

Figure 4:
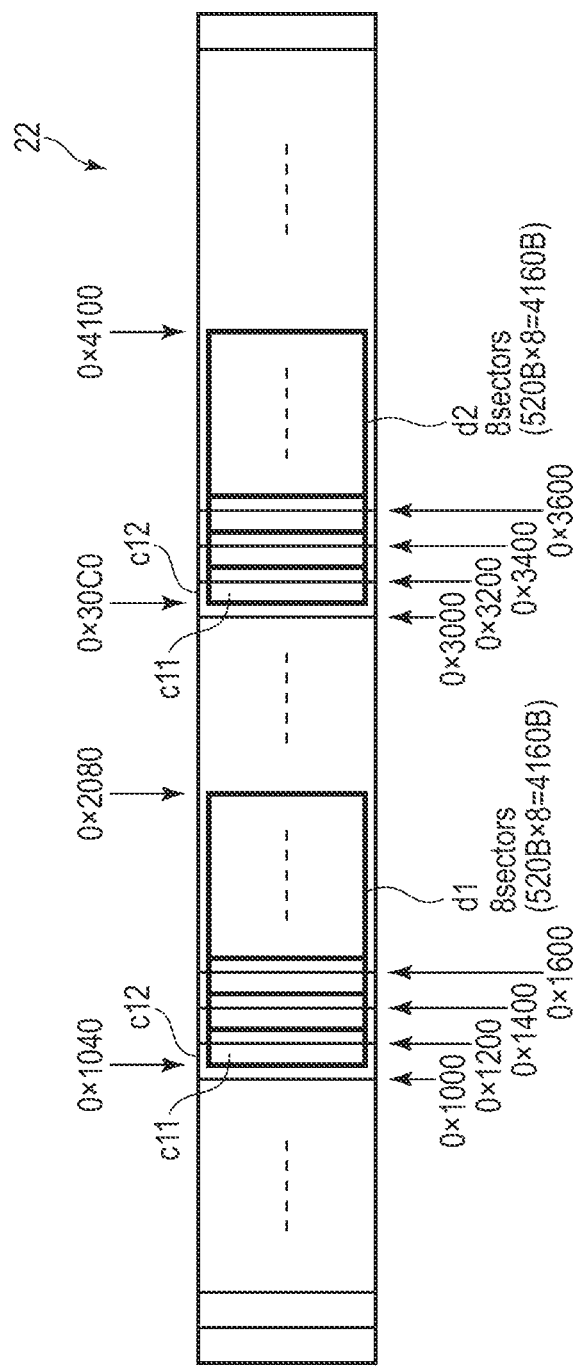
FIG. 4 is an illustration showing an example of a region which the host allocates in a host memory to store data read from the memory system according to the embodiment.

It is assumed in the example shown in FIG. 4 that, when a read command is issued, there is no continuous free region of 16 sectors in the host memory 22 (data buffer 22A), and therefore the CPU 21 combines two free regions (d1 and d2) of 8 sectors and designates the combined regions as the storage destination of read data. The region d1 has a size of 8 sectors (520×8=4160 bytes) spanning from a host memory address "0x1040" to a host memory address "0x2080". Here, "0xNNNN" indicates a hexadecimal digit. Note that, unless otherwise noted, an address represented as a hexadecimal digit is a byte address. That is, one byte of data is stored between a location indicated as an address 0xNNNN and a location indicated as an address (0xNNNN+0x0001). The region d2 has a size of 8 sectors (520×8=4160 bytes) spanning from a host memory address "0x30C0" to a host memory address "0x4100". The storage destination of the first 8 sectors of read data is the region d1, and the storage destination of the second 8 sectors of read data is the region d2. In this case, two PRP/SGLs each for the region d1 and the region d2 are created. A plurality of host memory addresses including a host memory address indicating the start of each region may be stored in each PRP/SGL.

The host memory address "0x1040" indicating the start location of the region d1 is not aligned with the second boundary (host access boundary) defined in a unit of 512 (0x0200) bytes. Therefore, the first sections (sectors) arranged from the host memory address "0x1040" cross the host access boundaries, respectively. FIG. 4 shows an example where three first sections (sectors) arranged from the host memory address "0x1040" cross the host access boundaries (0x1200, 0x1400 and 0x1600), respectively. Similarly, the host memory address "0x30C0" indicating the start location of the region d2 is not aligned with the second boundary (host access boundary) defined in a unit of 512 (0x0200) bytes. Therefore, the first sections (sectors) arranged from the host memory address "0x30C0" cross the host access boundaries, respectively. FIG. 4 shows an example where three first sections (sectors) arranged from the host memory address "0x30C0" cross the host access boundaries (0x3200, 0x3400 and 0x3600), respectively.

Here, a comparative example of the transmission of read data to the host 2 will be described. A host interface controller of a memory system according to the comparative example has no pool buffer.

FIG. 5 is an illustration showing an example where the memory system of the comparative example transmits read data to the host 2 with TLPs. FIG. 5 shows an example of the transmission of TLPs whose storage destination is the region d1. FIG. 5 (A) shows a memory block group arranged from a host memory address "0x1000" in the host memory 22. The first memory block [0] in the memory block group is arranged from the host memory address "0x1000". The second memory block [1] in the memory block group is arranged from a host memory address "0x1200". The third memory block [2] in the memory block group is arranged from a host memory address "0x1400". The fourth memory block [3] in the memory block group is arranged from a host memory address "0x1600". In order to protect data, in some cases, an ECC parity is generated in a unit of memory block indicated by a symbol f1.

Here, it is assumed that the MPS is defined to 512 bytes which is the size of the second section (memory block). When the remaining amount of the read data (i.e., part of the read data that has not yet been transmitted) is greater than or equal to the MPS (512 bytes), the host interface controller of the comparative example, which is to transmit 4160 bytes of read data to be stored in the region d1, always contains in TLPs the read data in units of MPS and transmits each of the TLPs to the host 2. Therefore, as shown in FIG. 5 (B1), first, the host interface controller of the comparative example transmits a TLP #0 including 512 bytes of the read data and the TLP #0 includes the read data to be stored at the host memory address "0x1040", which is the start of the region d1.

The first TLP #0 includes a total of 512 bytes of the read data: 448 bytes from a location at "0x1040" in the memory block [0] and 64 bytes from a location at "0x1200", which is the start of the memory block [1]. When an ECC parity is generated in a unit of the memory block, the memory controller 23 of the host 2 obtains 64 bytes of already stored data from a location at "0x1000", which is the start of the memory block [0], combines the 64 bytes of obtained data with 448 bytes of read data received in the TLP #0, and creates an ECC parity for 512 bytes of data to be stored in the memory block [0].

As shown in FIG. 5 (B2), the host interface controller of the comparative example then transmits a TLP #1 including 512 bytes from the 513th byte of the read data, which includes the read data to be stored at a host memory address "0x1240" of a storage destination thereof. The TLP #1 includes a total of 512 bytes of data: 448 bytes from a location at "0x1240" in the memory block [1] and 64 bytes from a location at "0x1400", which is the start of the memory block [2]. As is the case of the memory block [0], the memory controller 23 of the host 2 obtains 64 bytes of already stored data from the location at "0x1200", which is the start of the memory block [1], combines the 64 bytes of obtained data with 448 bytes of read data received in the TLP #1, and creates an ECC parity for 512 bytes of data to be stored in the memory block [1].

As shown in FIG. 5 (B3), the host interface controller of the comparative example then transmits a TLP #2 including 512 bytes from the 1025th byte of the read data, which includes the read data to be stored at a host memory address "0x1440" of a storage destination thereof. The TLP #2 includes a total of 512 bytes of data: 448 bytes from a location at "0x1440" in the memory block [2] and 64 bytes from a location at "0x1600", which is the start of the memory block [3]. As is the case of the memory block [0] and the memory block [1], the memory controller 23 of the host 2 obtains 64 bytes of already stored data from the location at "0x1400", which is the start of the memory block [2], combines the 64 bytes of obtained data with 448 bytes of read data received in the TLP #2, and creates an ECC parity for 512 bytes of data to be stored in the memory block [2].

The host interface controller of the comparative example transmits TLPs #3 to #8 to the host 2 similarly. The size of read data included in the TLP #8 is 64 (520×8−512×8) bytes.

FIG. 5 (C) shows a list of TLPs transmitted to the host 2 to store 8 sectors of the read data in the region d1 (see FIG. 4) by the host interface controller of the comparative example. Since the second boundary (host access boundary) in the host memory is defined in a unit of 512 (0x0200), 512 bytes of the read data transmitted with each of the TLPs #0 to #7 and 64 bytes of the read data transmitted with the TLP #8 cross the second boundaries, respectively.

As described above, in the host interface controller of the comparative example, when the host memory address designated using the PRP/SGL by the host 2 is not aligned with the second boundary (host access boundary) in the host memory 22, many items of data transmitted with the TLPs cross the second boundaries. When many items of data transmitted with the TLPs cross the second boundaries, large overhead may be necessary during, for example, ECC parity generation.

Next, an example where the host interface controller 32 according to the embodiment transmits read data to the host 2 with TLPs will be described with reference to FIG. 6. As is the case in the above comparative example, FIG. 6 shows an example of the transmission of TLPs whose storage destination is the region d1 (see FIG. 4), and shows the memory block group arranged from the host memory address "0x1000" in the host memory 22.

Figure 6:
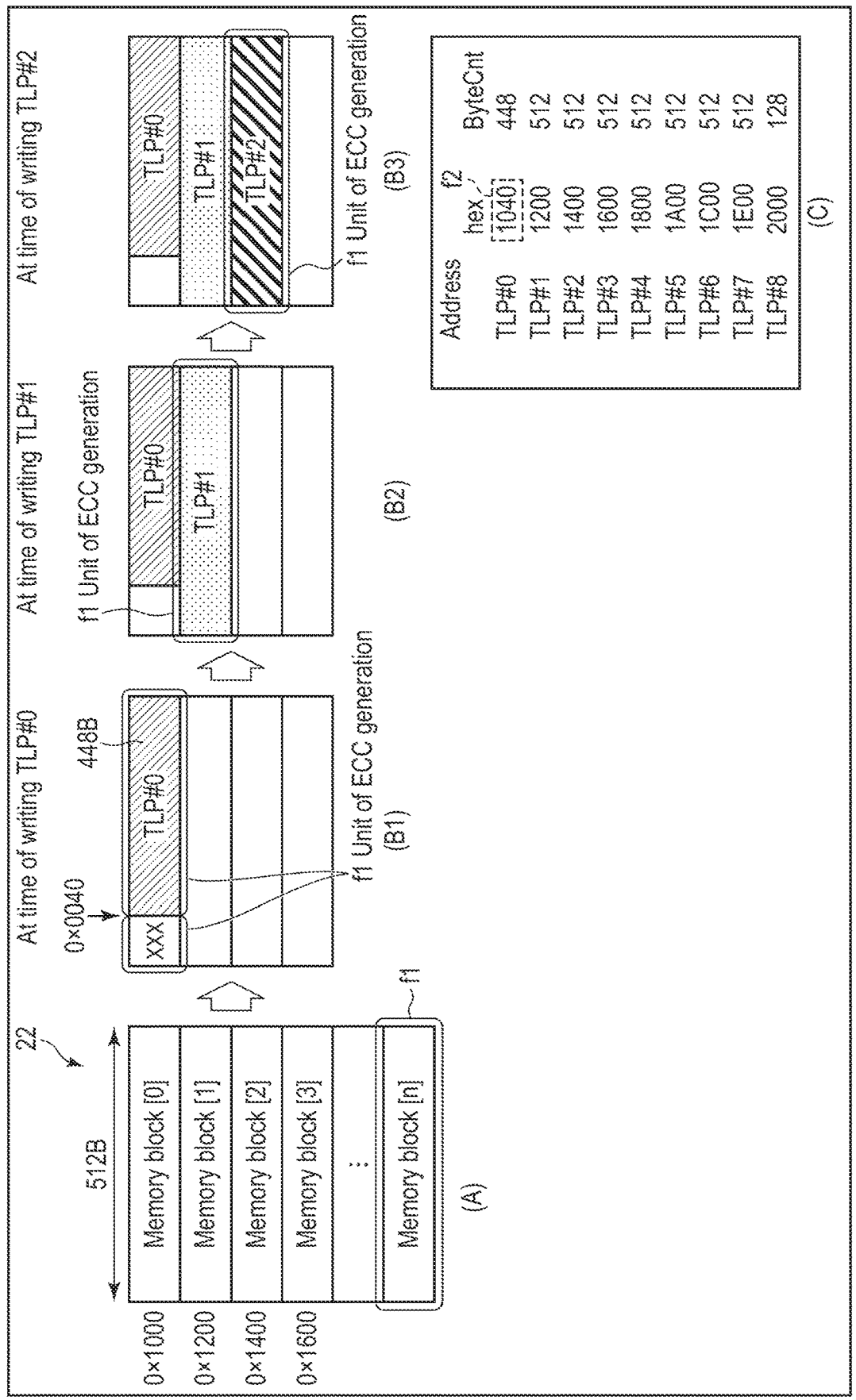
FIG. 6 is an illustration showing an example where the memory system according to the embodiment transmits read data to the host with a TLP.

As shown in FIG. 6 (B1), the host interface controller 32 of the embodiment first transmits a TLP #0 including 448 bytes of the read data, which includes the read data to be stored at the host memory address "0x1040", which is the start of the region d1 and corresponds to a size from the host memory address "0x1040" to the second boundary. The host interface controller 32 sets the size of the read data included in the TLP #0 not to 512 bytes but to 448 bytes, for example. The details will be described later.

The first TLP #0 includes 448 bytes of the read data from the location at "0x1040" in the memory block [0]. Regarding the memory block [0], as is the case in the comparative example, the memory controller 23 of the host 2 obtains 64 bytes of already stored data from the location at "0x1000", which is the start of the memory block [0], combines the 64 bytes of obtained data with 448 bytes of read data received in the TLP #0, and creates an ECC parity for 512 bytes of data to be stored in the memory block [0].

As shown in FIG. 6 (B2), the host interface controller 32 then transmits a TLP #1 including 512 bytes from the 449th byte of the read data, which includes the read data to be stored at a host memory address "0x1200" of a storage destination thereof. The TLP #1 includes 512 bytes of data from the location at "0x1200", which is the start of the memory block [1]. Regarding the memory block [1], the memory controller 23 of the host 2 can generate an ECC parity only by data received with the TLP #1.

As shown in FIG. 6 (B3), the host interface controller 32 then transmits a TLP #2 including 512 bytes from the 961th byte of the read data, which includes the read data to be stored at a host memory address "0x1400" of a storage destination thereof. The TLP #2 includes 512 bytes of data from the location at "0x1400", which is the start of the memory block [2]. Also regarding the memory block [2], the memory controller 23 of the host 2 can generate an ECC parity only by data received with the TLP #2.

The host interface controller 32 of the embodiment transmits TLPs #3 to #8 to the host 2 similarly. The size of read data included in the TLP #8 is 128 (520×8−448−512×7) bytes.

FIG. 6 (C) shows a list of TLPs transmitted to the host 2 to store 8 sectors of the read data in the region d1 (see FIG. 4) by the host interface controller 32 of the embodiment. Since 448 bytes of the read data transmitted in the TLP #0 (symbol f2) is stored from the host memory address "0x1040" designated by the host 2, the start is not aligned with the second boundary (host access boundary) in the host memory 22 but the end is aligned with the second boundary. Both the start and the end of 512 bytes of the read data transmitted in each of the TLPs #1 to #7 are aligned with the second boundaries, respectively. The start of 128 bytes of the read data transmitted in the TLP #8 is aligned with the second boundary.

As described above, even when the host memory address designated using the PRP/SGL by the host 2 is not aligned with the second boundary (host access boundary), the host interface controller 32 of the embodiment ensures address alignment with the host access boundary for the read data transmitted to the host 2 with the TLP.

Figure 7:
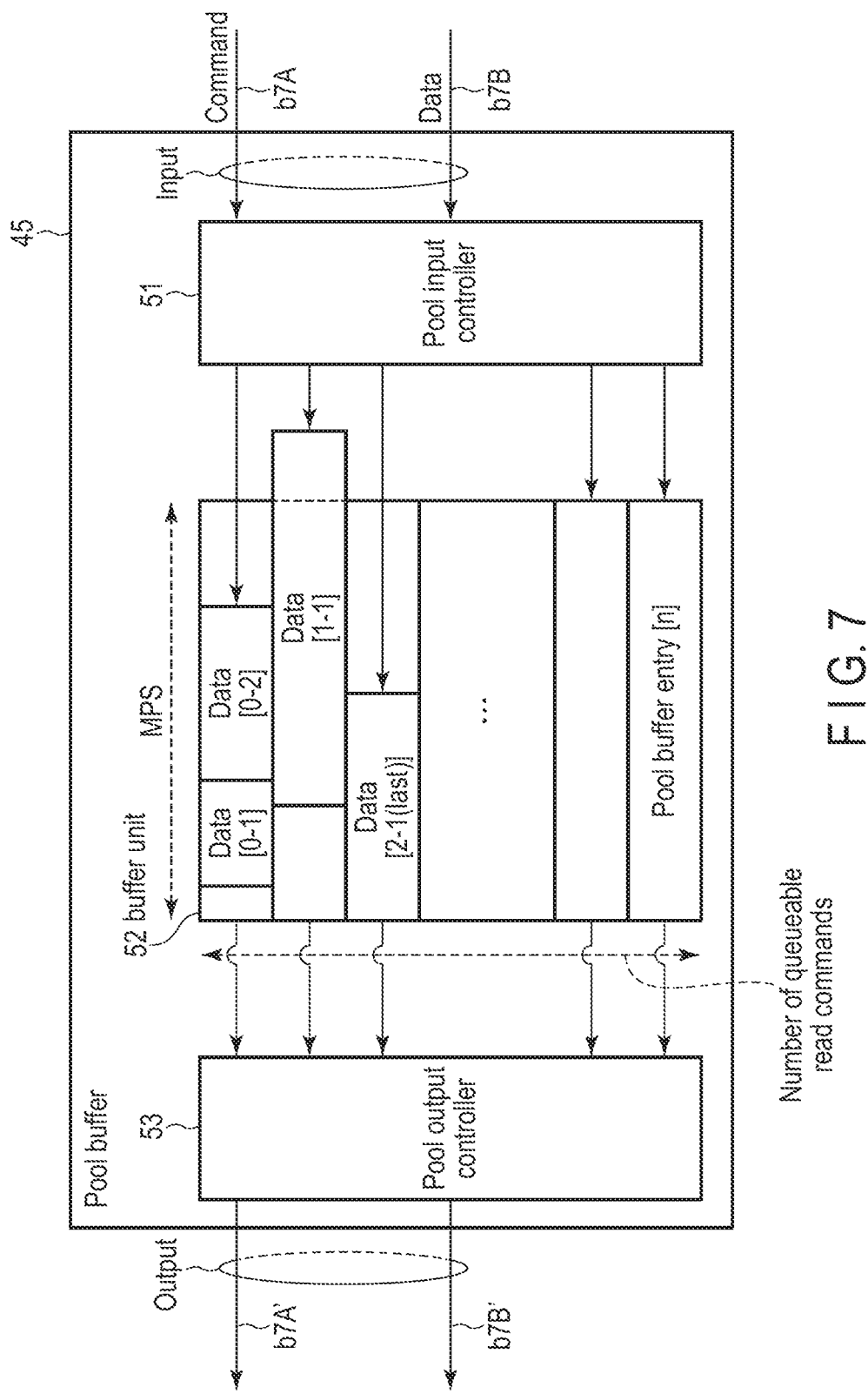
FIG. 7 is an illustration showing an example of a configuration of a pool buffer of the memory system according to the embodiment.

FIG. 7 is an illustration showing an example of a configuration of the pool buffer 45. The pool buffer 45 includes a buffer unit 52 in addition to the control circuit 45A shown in FIG. 2. The control circuit 45A includes a pool input controller 51 and a pool output controller 53.

The pool input controller 51 is a control device which controls a command (b7A) and data (b7B) transmitted from the protocol converter 44. The command (b7A) includes a data length and identification information which can identify a read command requesting the read data (b7B) in addition to a host memory address. The pool input controller 51 stores the read data (b7B) in the buffer unit 52 based on the identification information of the read command, the host memory address and the data length indicated with the command (b7A).

The buffer unit 52 is a buffer that includes a plurality of entries (pool buffer entries). The buffer unit 52 is provided in, for example, an SRAM (not shown) in the controller 11. The number of pool buffer entries is greater than or equal to the number of read commands that can be queued at one time by the memory system 1. The size of each pool buffer entry is equal to the MPS. The SRAM constituting the buffer unit 52 has a capacity to accommodate a pool buffer entry corresponding to the maximum MPS supportable by the memory system 1. One read command is associated with one entry. Through the pool buffer entry, the read data read from the NAND memory 12 according to the read command and to be transmitted to the host 2 with the TLP is to have such a size that address alignment with the host access boundary is ensured.

The pool input controller 51 which stores the read data (b7B) in the buffer unit 52 first specifies a pool buffer entry of the buffer unit 52 based on the identification information of the read command indicated with a command (b7A). Then, the pool input controller 51 determines the storage location of the read data (b7B) in the specified pool buffer entry based on the host memory address indicated with the command (b7A). As the storage location of the read data in the pool buffer entry, the pool input controller 51 determines, for example, an address indicated by lower 9 bits of the host memory address where the read data transmitted with the TLP is to be stored. That is, the pool input controller 51 stores the read data at a location which is offset by the address indicated by the lower 9 bits of the host memory address from the start of the pool buffer entry. For example, when the host memory address is "0x1040", the pool input controller 51 stores the data (b7B) from a location which is offset by "0x0040" bytes from the start of the pool buffer entry.

In FIG. 7, data [N-M] indicates read data (b7B) requested by the Mth command (b7A) in accordance with a read command whose identification information is N. A plurality of commands (b7A) may be transmitted from the protocol converter 44 in accordance with the read command N, and in this case, the value of M is incremented by 1 from 0. In addition, "last" indicates the last command transmitted from the protocol converter 44 in accordance with the read command N. That is, the command (b7A) further includes information indicating whether or not the command is the last command. Hereinafter, "last"=0 may indicate that the command is not the last command, and "last"=1 may indicate that the command is the last command.

In the example shown in FIG. 7, data [0-1], which is read data (b7B) requested by the first command (b7A) in accordance with a read command 0, and data [0-2], which is read data (b7B) requested by the second command (b7A) in accordance with the read command 0, are stored in a pool buffer entry 0. The "last" of both the data [0-1] and the data [0-2] are 0. In addition, data [1-1], which is read data (b7B) requested by the first command (b7A) in accordance with a read command 1, is stored in a pool buffer entry 1. The "last" of the data [1-1] is 0. Furthermore, data [2-1], which is read data (b7B) requested by the first command (b7A) in accordance with a read command 2 is stored in a pool buffer entry 2. The "last" of the data [2-1] is 1.

The pool output controller 53 transmits data (b7B) stored in each pool buffer entry of the buffer unit 52 to the PHY 31 as data to be transmitted to the host 2 under certain conditions. At the time, the pool output controller 53 reconfigures the command (b7A) and the data (b7B) and generates a command (b7A') and data (b7B').

Figure 8:
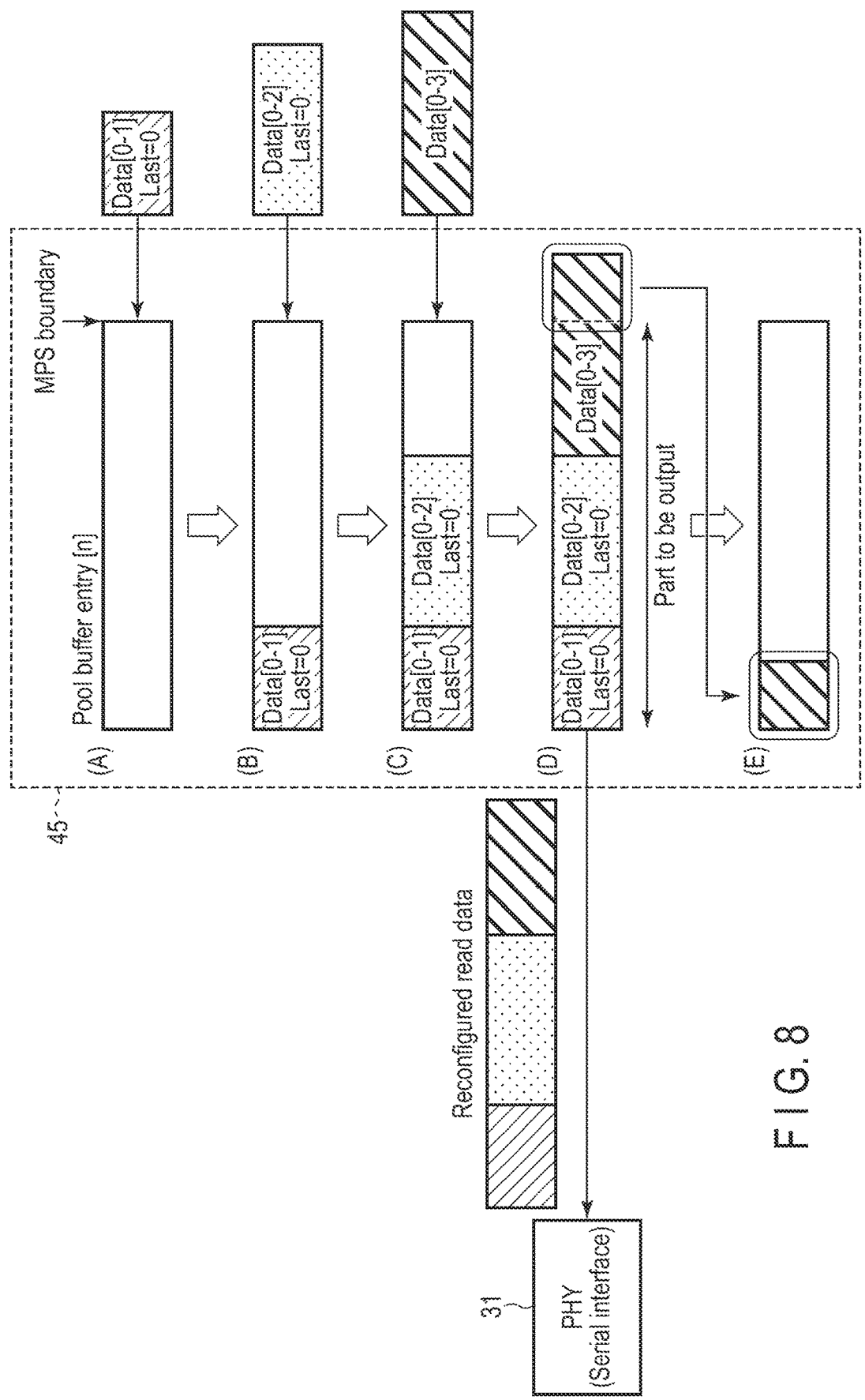
FIG. 8 is an illustration showing a first example of a basic operation of the pool buffer of the memory system according to the embodiment.

Next, a basic operation of the pool buffer 45 will be described. FIG. 8 is an illustration showing a first example of the basic operation of the pool buffer 45.

The first example is where a host memory address designated by the host 2 is aligned with the host access boundary.

First, a command and data [0-1] are input to the pool buffer 45. A host memory address designated in this command where this data [0-1] is to be stored is aligned with the host access boundary. The command input to the pool buffer 45 includes identification information (here 0) of a read command. As shown in FIG. 8 (A), when the first read data corresponding to a certain read command is input, the control circuit 45A allocates a pool buffer entry to the read command. More specifically, when the command input to the pool buffer 45 includes identification information of a read command with which no pool buffer entry is assigned, the control circuit 45A allocates a pool buffer entry which is not allocated to any read commands. As shown in FIG. 8 (B), the control circuit 45A stores the read data in the allocated pool buffer entry based on the host memory address designated in the command. Note that, as described above, the command input to the pool buffer 45 includes information indicating whether or not the command is the last command of the read command. When the control circuit 45A completes processing of the read data of the last command, the control circuit 45A releases the pool buffer entry.

As described above, the control circuit 45A determines the address indicated by the lower 9 bits of the host memory address as the storage location of the read data in the pool buffer entry. Here, it is assumed that the host memory address where the data [0-1] is to be stored is, for example, 0x1000. In this case, the data [0-1] is stored from the start of the pool buffer entry.

The command input to the pool buffer 45 includes the size of the read data. Therefore, when there is read data following this read data, the control circuit 45A can also calculate a host memory address indicating the storage location of the following read data.

When the second command and data [0-2] are input, the control circuit 45A specifies a pool buffer entry where this data [0-2] is to be stored based on identification information (here 0) of a read command included in the command. When the pool buffer entry is specified, the pool buffer 45 compares the host memory address indicating the storage location of the following read data calculated when the data [0-1] is stored, with the host memory address where the data [0-2] is to be stored. When these two match, the control circuit 45A determines that the data [0-2] is read data following the data [0-1]. As shown in FIG. 8 (C), when the data [0-2] is read data following the data [0-1], the control circuit 45A stores the data [0-2] continuously with the data [0-1] in the pool buffer entry. The control circuit 45A calculates a host memory address indicating the storage location of the following read data as is the case with when the data [0-1] is stored.

Also when the third command and data [0-3] are input, the control circuit 45A specifies a pool buffer entry where read data is to be stored based on identification information (here 0) of a read command included in the command. In addition, the control circuit 45A compares the host memory address indicating the storage location of the following read data calculated when the data [0-2] is stored, with the host memory address where the data [0-3] is to be stored. When these two match, the control circuit 45A determines that the data [0-3] is read data following the data [0-2]. As shown in FIG. 8 (D), when the data [0-3] is data following the data [0-2], the control circuit 45A stores the data [0-3] continuously with the data [0-2] in the pool buffer entry based on the host memory address where the data [0-3] is to be stored.

As described above, the command input to the pool buffer 45 includes the size of the read data. Therefore, when the control circuit 45A stores the read data in the pool buffer entry based on the host memory address, the control circuit 45A can determine whether or not the read data fits in the pool buffer entry. Here, as shown in FIG. 8 (D), it is assumed that the data [0-3] does not fit in the pool buffer entry. When the data [0-3] does not fit in the pool buffer entry, the control circuit 45A first stores a part of the data [0-3], which has a size fitting in the pool buffer entry, in the pool buffer entry. At the time, the read data of the MPS from the start of the data [0-1] to the middle of the data [0-3] is stored in the pool buffer entry. The control circuit 45A generates a command to transmit the read data of the MPS collectively, and outputs the command and the read data to the PHY 31.

Then, the control circuit 45A calculates a host memory address corresponding to the start of the remaining part of the data [0-3] which does not fit in the pool buffer entry. As shown in FIG. 8 (E), the control circuit 45A stores the remaining part of the data [0-3] in the pool buffer entry based on the calculated host memory address. The remaining part of the data [0-3] is stored from the start of the pool buffer entry.

After that, the operation of combining read data into the MPS and generating and outputting a command to transmit the read data of the MPS collectively is repeated until the last command is input. When the last command is input, even if the total size of read data corresponding to the command and read data stored in the pool buffer entry does not reach the MPS, the control circuit 45A generates a command to transmit these read data collectively and outputs the command to the PHY 31.

As described above, the pool buffer 45 combines a plurality of items of read data to be stored at continuous host memory addresses, which are input with a plurality of commands, into the MPS by storing the items of read data in a pool buffer entry. The pool buffer 45 then outputs the items of read data of the MPS to the PHY 31 by one command.

Figure 9:
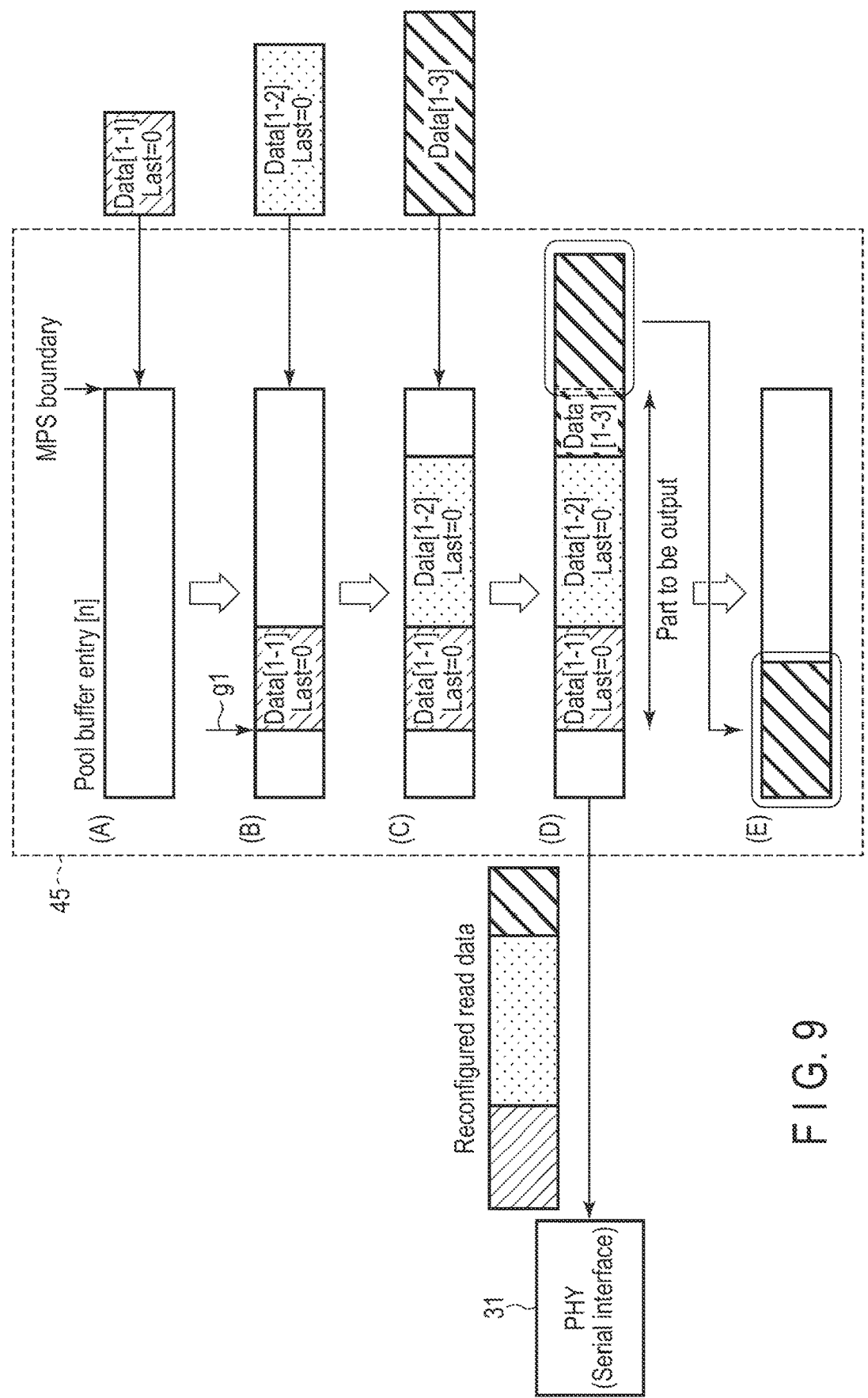
FIG. 9 is an illustration showing a second example of the basic operation of the pool buffer of the memory system according to the embodiment.

FIG. 9 is an illustration showing a second example of the basic operation of the pool buffer 45. The second example is where a host memory address designated by the host 2 is not aligned with the host access boundary.

In the second example, a command in which a host memory address not aligned with the host access boundary is designated, and data [1-1] are input. As shown in FIG. 9 (A), the control circuit 45A first allocates a pool buffer entry. As shown in FIG. 9 (B), the control circuit 45A stores the data [1-1] in the allocated pool buffer entry based on the host memory address where the data [1-1] is to be stored.

The control circuit 45A does not simply store data from the start of the pool buffer entry, but stores read data from a location in the pool buffer entry corresponding to a location in the memory block where the data is to be stored based on the host memory address. Here, it is assumed that the host memory address where the data [1-1] is to be stored is 0x1040. In this case, the data [1-1] is stored in a location (g1) which is offset by 0x0040 bytes from the start of the pool buffer entry. As described above, when the host memory address designated by the host 2 is not aligned with the host access boundary, the control circuit 45A stores the read data from the middle of the pool buffer entry.

When a second command and data [1-2] are input, the control circuit 45A specifies a pool buffer entry where the data [1-2] is to be stored. In addition, the control circuit 45A determines whether or not the data [1-2] is read data following the data [1-1]. As shown in FIG. 9 (C), if the data [1-2] is read data following the data [1-1], the control circuit 45A stores the data [1-2] continuously with the data [1-1] in the pool buffer entry.

Also when a third command and data [1-3] are input, the control circuit 45A specifies a pool buffer entry where the data [1-3] is to be stored. In addition, the control circuit 45A determines whether or not the data [1-3] is read data following the data [1-2]. As shown in FIG. 9 (D), if the data [1-3] is read data following the data [1-2], the control circuit 45A stores the data [1-3] continuously with the data [1-2] in the pool buffer entry.

Here, as shown in FIG. 9 (D), it is assumed that, when the control circuit 45A stores the data [1-3] in the pool buffer entry based on the host memory address, the data [1-3] does not fit in the pool buffer entry. The control circuit 45A first stores a part of the data [1-3], which has a size fitting in the pool buffer entry, in the pool buffer entry, generates a command to transmit read data stored in the pool buffer entry collectively, and outputs the command and the read data to the PHY 31.

The size of the read data output at this time is a size less than the MPS, and a host memory address corresponding to the start of this data is the host memory address designated by the host 2. This host memory address is not aligned with the host access boundary. However, a host memory address corresponding to the end of this read data is aligned with the host access boundary.

In addition, as shown in FIG. 9 (E), the remaining part of the data [1-3] which does not fit in the pool buffer entry is stored from the start of the pool buffer entry. Then, the following read data is combined into the MPS and output via the pool buffer entry. That is, from here on, the command and the read data are generated while alignment with the host access boundary is ensured.

As described above, the memory system 1 of the embodiment can ensure alignment with the host access boundary even when the host memory address designated by the host 2 is not aligned with the host access boundary.

Figure 10:
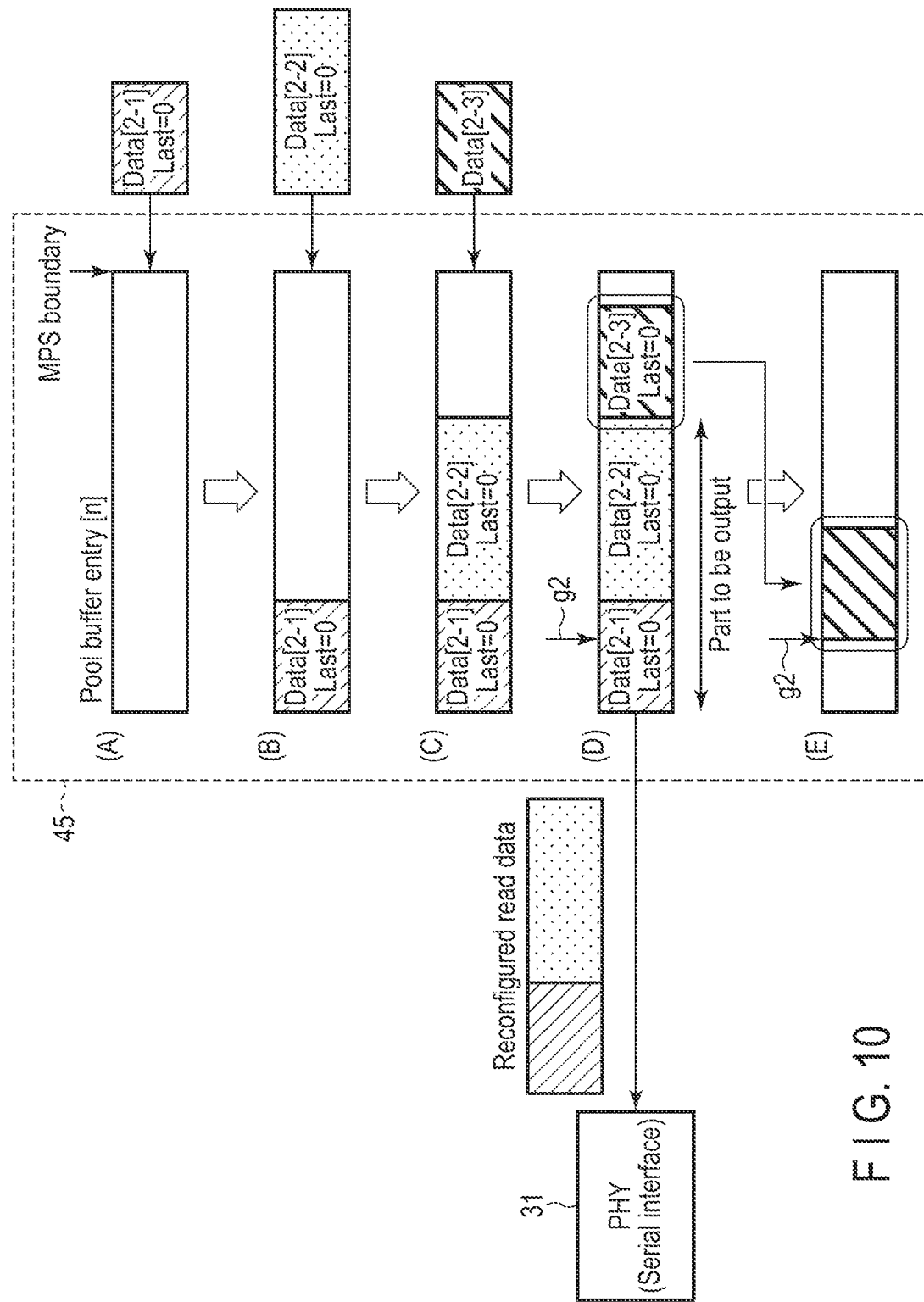
FIG. 10 is an illustration showing a third example of the basic operation of the pool buffer of the memory system according to the embodiment.

FIG. 10 is an illustration showing a third example of the basic operation of the pool buffer 45. The third example is where non-continuous read data is detected. The non-continuous read data is such read data that a host memory address designated in a command does not match a host memory address that has been calculated when the previous read data is stored to indicate the storage location of the following read data.

FIG. 10 (A) to (C) show a case where, after data [2-1] of a first command and data [2-2] of a second command are stored in a pool buffer entry. Here, it is assumed that a host memory address designated in a third command where data [2-3] is to be stored does not match a host memory address, which has been calculated when the data [2-2] is stored, indicating the storage location of the following read data. As shown in FIG. 10 (D), a symbol g2 indicates a location in the pool buffer entry where the data [2-3] is to be stored, which is calculated from a host memory address where the data [2-3] is to be stored.

When such non-continuous read data is detected, even if the size of the read data stored in the pool buffer entry is less than the MPS, the control circuit 45A generates a command to transmit the read data stored in the pool buffer entry collectively and outputs the command to the PHY 31. In the example shown in FIG. 10, the control circuit 45A generates a command to transmit the data [2-1] and the data [2-2] collectively, and outputs the command to the PHY 31. After that, as shown in FIG. 10 (E), the data [2-3] is stored in the location indicated by the symbol g2 in the pool buffer entry.

Accordingly, regarding a plurality of items of read data to be stored in a plurality of non-continuous regions in the host memory 22 respectively, even if they go through the pool buffer entry, the items of data whose storage destinations are different regions in the host memory 22 will not be combined into one TLP.

An example where non-continuous read data is input is, for example, as shown in FIG. 4, a case where the host 2 designates a plurality of non-continuous regions in the host memory 22 as the storage destinations for a plurality of items of read data. For example, non-continuous read data is input at a timing when a host memory address, which the read controller 42 obtains from the address management table 43, is switched from a host memory address stored in one PRP/SGL to a host memory address stored in another PRP/SGL.

Figure 11:
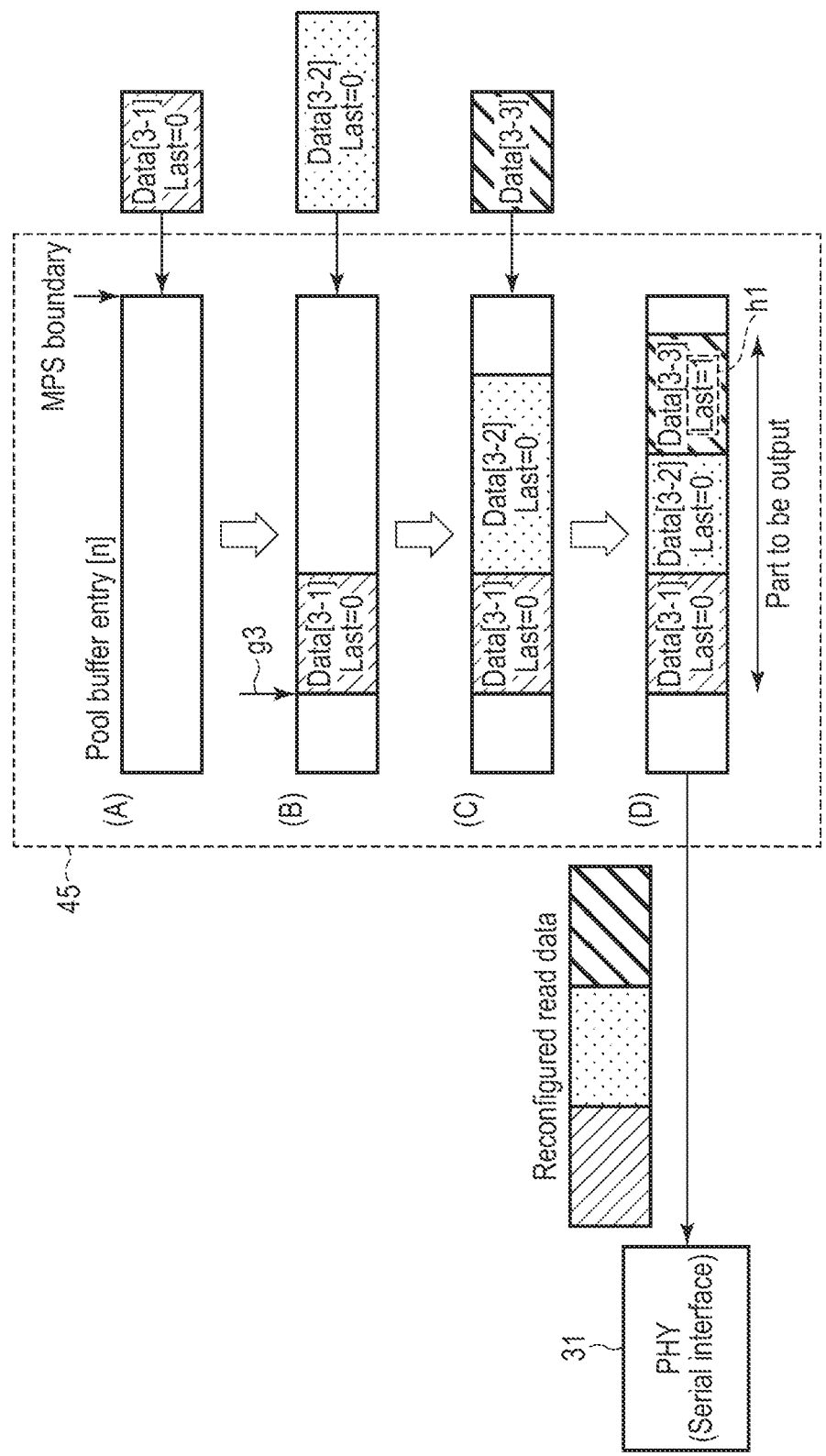
FIG. 11 is an illustration showing a fourth example of the basic operation of the pool buffer of the memory system according to the embodiment.

FIG. 11 is an illustration showing a fourth example of the basic operation of the pool buffer 45. The fourth example is where the last command is detected. The last command is a command that includes information to indicate whether or not the command is the last command indicates that the command is the last command.

FIG. 11 (A) to (C) show a case where, after data [3-1] of a first command and data [3-2] of a second command are stored in a pool buffer entry, a third command is detected to be the last command. In the drawing, "last"=1 indicated by a symbol hi indicates that the third command is the last command.

When the last command is detected, even if the size of the read data stored in the pool buffer entry is less than the MPS, the control circuit 45A generates a command to transmit the read data stored in the pool buffer entry collectively and outputs the command to the PHY 31. As shown in FIG. 11 (D), the control circuit 45A generates a command to transmit the data [3-1], the data [3-2], and the data [3-3] of the third command (the last command) collectively, and outputs the command to the PHY 31.

Accordingly, for example, there will be no such situation where the last part of read data is held in the pool buffer entry continuously due to the size of read data stored in the pool buffer entry not reaching the MPS.

Figure 13:
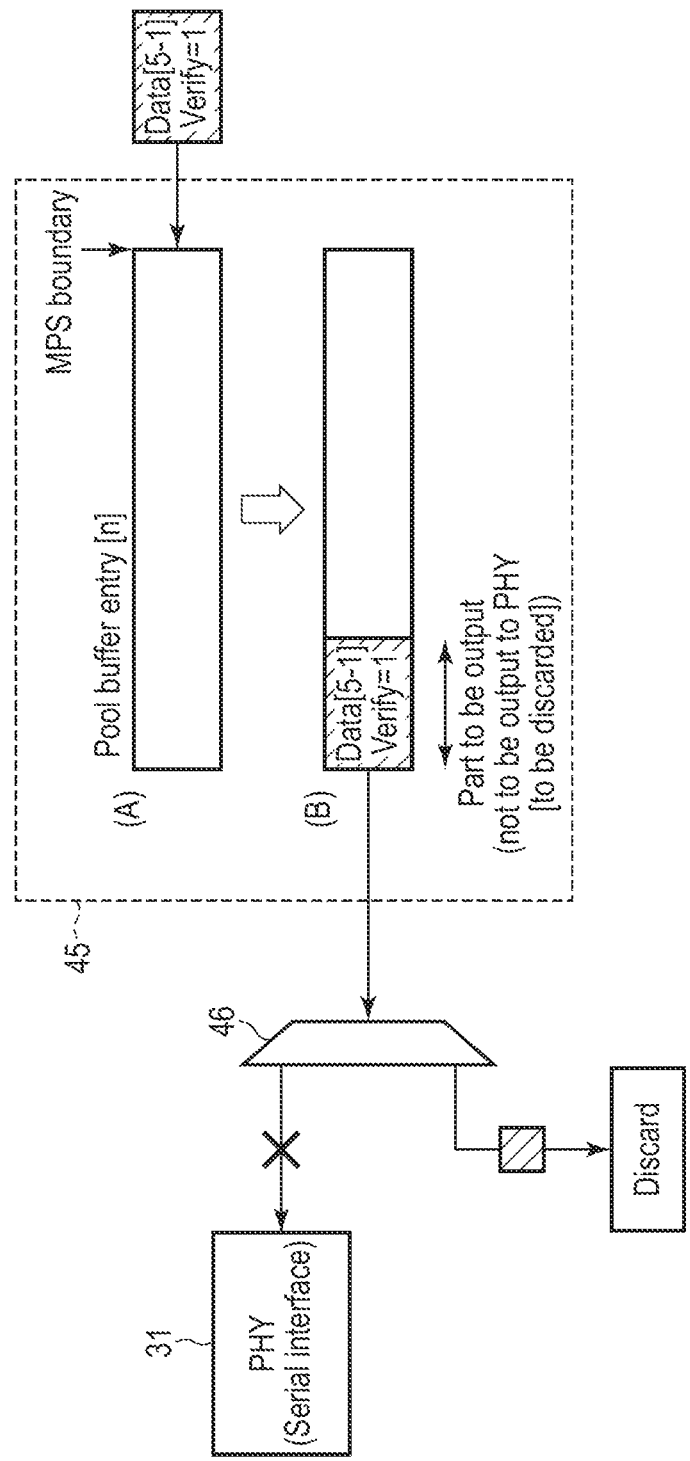
FIG. 13 is a second illustration showing the first example of the exceptional operations of the pool buffer of the memory system according to the embodiment.

Next, exceptional operations of the pool buffer 45 will be described. FIG. 12 and FIG. 13 are illustrations showing a first example of the exceptional operations of the pool buffer 45.

Commands input to the pool buffer 45 may have an attribute such as an SGL Bit Bucket attribute, a Verify attribute or an Error attribute.

The SGL Bit Bucket attribute is an attribute of a command corresponding read data that is read from the NAND memory 12 in accordance with a read command from the host 2 but designated as unnecessary by the host 2. For example, when the host 2 reads a plurality of items of data stored in a plurality of non-continuous regions in the NAND memory 12, instead of issuing a plurality of read commands for the regions, the host 2 can issue one read command for one large region that covers the regions, and designate data in a gap region between the regions as unnecessary. The SGL Bit Bucket attribute is an attribute of a command corresponding to read data in the gap region designated as an unnecessary part. The read data of the command having the SGL Bit Bucket attribute is not transmitted to the host 2.

The Verify attribute is an attribute of a command corresponding to read data which is read from the NAND memory 12 in accordance with a command issued by the host 2, to check the validity of data. The read data of the command having the Verify attribute is checked for validity using the ECC parity but is not transmitted to the host 2.

The Error attribute is an attribute of a command corresponding to read data which is read from the NAND memory 12 in accordance with a read command from the host 2 and contains an error uncorrectable using the ECC parity. The read data of the command having the Error attribute is not transmitted to the host 2.

The read data of a command having any of the SGL Bit Bucket attribute, the Verify attribute or the Error attribute does not need to be transmitted to the host 2. The host interface controller 32 includes a selector 46 which discards a command having any of these attributes and read data thereof, of the command and the read data output from the pool buffer 45.

The command having the SGL Bit Bucket attribute, the Verify attribute or the Error attribute and the read data thereof are discarded through the selector 46. Consequently, the control circuit 45A outputs the read data of the command having any of these attributes from the pool buffer entry immediately without performing processing such as holding in the pool buffer entry until the read data is combined into the MPS.

FIG. 12 and FIG. 13 show an example where a command having the Verify attribute is input. FIG. 12 shows an example where a command having the Verify attribute and data [4-1] longer than the MPS are input. On the other hand, FIG. 13 shows an example where a command having the Verify attribute and data [5-1] shorter the MPS are input. When the command having the Verify attribute is input, the control circuit 45A passes the data [4-1] (FIG. 12) and [5-1] (FIG. 13) of this command through the pool buffer entry without performing processing such as that described above, and outputs the data [4-1] and [5-1] from the pool buffer entry immediately. The data [4-1] and [5-1] output from the pool buffer entry are not output to the PHY 31 through the selector 46. That is, the data [4-1] and [5-1] are discarded. The same applies to a case where a command having the SGL Bit Bucket attribute or a command having the Error attribute is input.

That is, in the case of read data of a command having the Verify attribute, the SGL Bit Bucket attribute or the Error attribute, the control circuit 45A does not perform processing such as dividing data longer than the MPS into the MPS or processing such as combining data shorter than the MPS into the MPS.

Accordingly, the control circuit 45A does not perform processing such as that described above uselessly for data not transmitted to the host 2.

Figure 14:
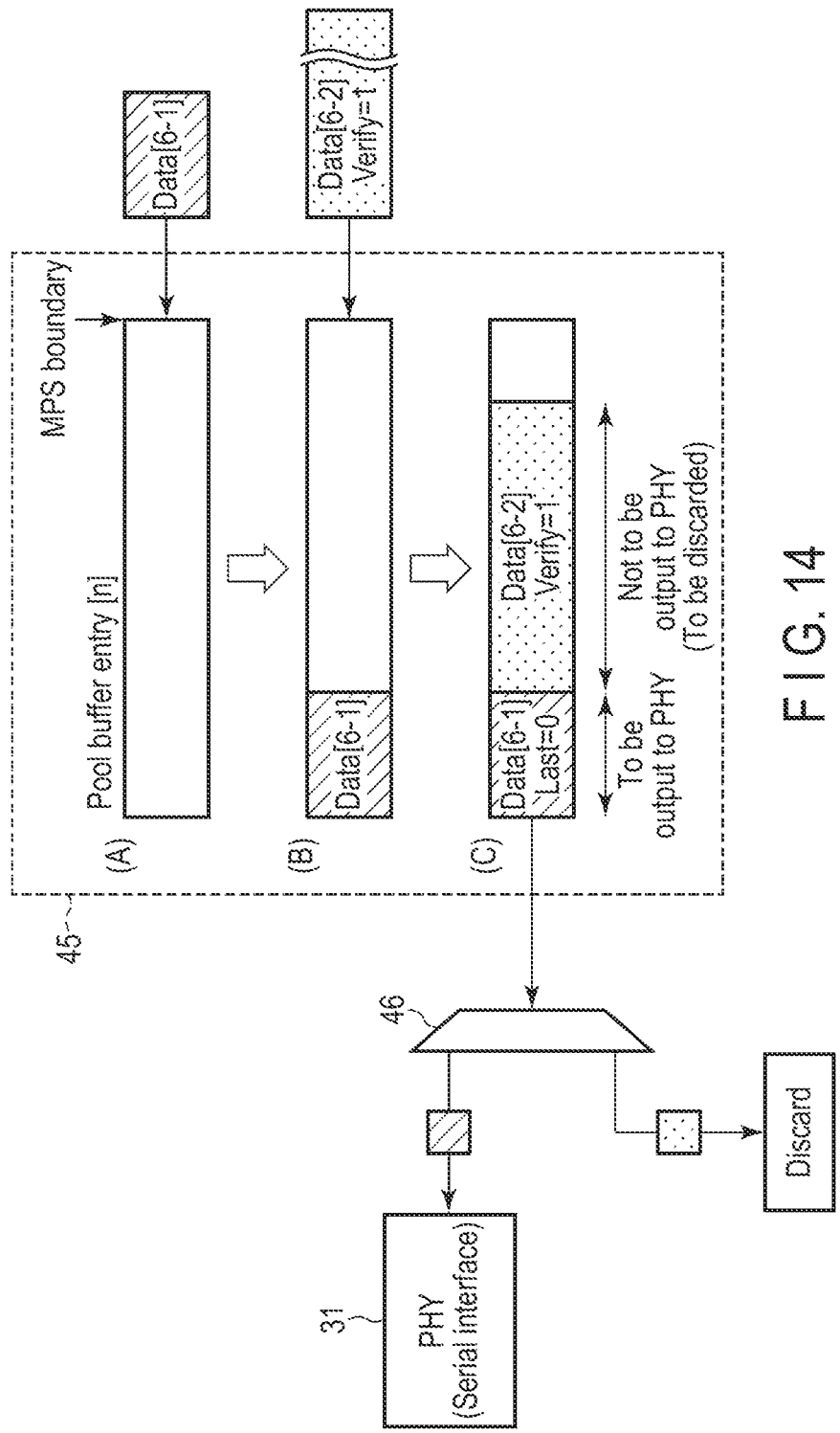
FIG. 14 is an illustration showing a second example of the exceptional operations of the pool buffer of the memory system according to the embodiment.

FIG. 14 is an illustration showing a second example of the exceptional operations of the pool buffer 45.

The second example is where a command having the Verify attribute is input in a state where a normal command (e.g., a command not having an attribute such as the SGL Bit Bucket attribute, the Verify attribute or the Error attribute) and read data thereof have been input and stored in a pool buffer entry (FIGS. 14 (A) and (B)).

In this case, as shown in FIG. 14 (C), even if the size of read data stored in the pool buffer entry is less than the MPS, the control circuit 45A first generates and outputs a command to transmit read data stored in the pool buffer entry collectively. After the output, the control circuit 45A outputs the command having the Verify attribute and read data thereof. The same applies to a case where a command having the SGL Bit Bucket attribute or a command having the Error attribute is input.

In the example shown in FIG. 14, data [6-1] of a normal command is stored in a pool buffer entry. The size of the data [6-1] is less than the MPS. In this state, when a command having the Verify attribute is input, the control circuit 45A generates a command to transmit the data [6-1], and outputs the command and read data including the data [6-1] from the pool buffer entry. The data [6-1] output from the pool buffer entry is output to the PHY 31 through the selector 46. Data [6-2] of the command having the Verify attribute is not output to the PHY 31 through the selector 46 as described with reference to FIG. 12 and FIG. 13.

Accordingly, for example, the read data to be transmitted to the host 2, which is already stored in the pool buffer entry, and the read data not to be transmitted to the host 2 will not be combined into one TLP.

As described above, the memory system 1 of the embodiment can ensure address alignment with the host access boundary for the read data transmitted to the host 2 even when the host memory address designated as the storage location of the read data by the host 2 is not aligned with the host access boundary. That is, the memory system 1 of the embodiment can efficiently transmit data to the host 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable with a host, the host including a host memory and a control circuit, the control circuit being configured to access the host memory in a unit of a first size, the memory system comprising:
 a nonvolatile memory; and
 a controller capable of communicating with the host and configured to:
 when an address designated by the host as a first location of the host memory where read data read from the nonvolatile memory is to be stored is not aligned with a boundary in the host memory defined in a unit of the first size,
 transmit, to the host, a first packet which has a second size and includes the read data to be stored from the first location, the second size being smaller than the first size, the second size being from the first location to the boundary; and
 transmit, to the host, a second packet which has the first size and includes the read data to be stored from the boundary thereafter.

2. The memory system of claim 1, further comprising a buffer capable of storing data having the first size, wherein the controller is further configured to:
calculate a location of the buffer where the read data is to be stored based on the address;
store the read data in the calculated location of the buffer; and
generate the first packet based on the read data stored in the calculated location of the buffer.

3. The memory system of claim 2, wherein
the controller is configured to store the read data in the calculated location of the buffer which has an address offset from a start of the buffer by lower bits of the address.

4. The memory system of claim 2, wherein
the controller is further configured to:
sequentially store a plurality of items of the read data in the buffer; and
output the items of the read data stored in the buffer from the buffer when the items of the read data are stored to an end of the buffer.

5. The memory system of claim 2, wherein
while first read data is stored in a middle of the buffer and in a case where second read data, which is to be stored in a location of the host memory that is non-continuous with a location of the host memory where the first read data is to be stored, is read from the nonvolatile memory, the controller is further configured to output the first read data from the buffer.

6. The memory system of claim 2, wherein the controller is further configured to output the read data from the buffer when the read data, which is read from the nonvolatile memory last in accordance with a read command from the host requesting to transmit the read data, is stored in the buffer.

7. The memory system of claim 6, wherein when second read data having a first attribute is read from the nonvolatile memory while first read data is stored in a middle of the buffer, the controller is further configured to output the first read data from the buffer and discard the second read data having the first attribute thereafter.

8. The memory system of claim 7, wherein the second read data having the first attribute is a part of the read data that is read from the nonvolatile memory and is designated as an unnecessary part by the host.

9. The memory system of claim 7, wherein the second read data having the first attribute is the read data that is read from the nonvolatile memory for validity check and is not to be transmitted to the host.

10. The memory system of claim 7, wherein the second read data having the first attribute is the read data that is read from the nonvolatile memory and contains an uncorrectable error.

11. A method of controlling a nonvolatile memory, comprising:
communicating with a host, the host including a host memory and a control circuit, the control circuit being configured to access the host memory in a unit of a first size; and
when an address designated by the host as a first location of the host memory where read data read from the nonvolatile memory is to be stored is not aligned with a boundary in the host memory defined in a unit of the first size,
transmitting, to the host, a first packet which has a second size and includes the read data to be stored from the first location, the second size being smaller than the first size, the second size being from the first location to the boundary; and
transmitting, to the host, a second packet which has the first size and includes the read data to be stored from the boundary thereafter.

12. The method of claim 11, further comprising:
managing a buffer capable of storing data having the first size;
calculating a location of the buffer where the read data is to be stored based on the address;
storing the read data in the calculated location of the buffer; and
generating the first packet based on the read data stored in the calculated location of the buffer.

13. The method of claim 12, wherein
the read data is stored in the calculated location of the buffer which has an address offset from a start of the buffer by lower bits of the address.

14. The method of claim 12, further comprising:
sequentially storing a plurality of items of the read data in the buffer, and
outputting the items of the read data stored in the buffer from the buffer when the items of the read data are stored to an end of the buffer.

15. The method of claim 12, further comprising:
while first read data is stored in a middle of the buffer and in a case where second read data, which is to be stored in a location of the host memory that is non-continuous with a location of the host memory where the first read data is to be stored, is read from the nonvolatile memory, outputting the first read data from the buffer.

16. The method of claim 12, further comprising:
when the read data, which is read from the nonvolatile memory last in accordance with a read command from the host requesting to transmit the read data, is stored in the buffer, outputting the read data from the buffer.

17. The method of claim 16, further comprising:
when second read data having a first attribute is read from the nonvolatile memory while first read data is stored in a middle of the buffer, outputting the first read data from the buffer and discarding the second read data having the first attribute thereafter.

18. The method of claim 17, wherein the second read data having the first attribute is a part of the read data that is read from the nonvolatile memory and is designated as an unnecessary part by the host.

19. The method of claim 17, wherein the second read data having the first attribute is the read data that is read from the nonvolatile memory for validity check and is not to be transmitted to the host.

20. The method of claim 17, wherein the second read data having the first attribute is the read data that is read from the nonvolatile memory and contains an uncorrectable error.

* * * * *